(12) United States Patent
Althaus et al.

(10) Patent No.: US 10,214,623 B2
(45) Date of Patent: Feb. 26, 2019

(54) SUBSTRATE-INDEPENDENTLY SURFACE-COATED POLYMER BY AROMATIC-AMINE COMPOUND AND COATING METHOD THEREOF

(71) Applicant: Core Biosystems Inc., Redmond, WA (US)

(72) Inventors: John S. Althaus, Saline, MI (US); Kyong Hoon Lee, Redmond, WA (US); Gareth M. Fotouhi, Seattle, WA (US); Shinnosuke Inoue, Seattle, WA (US); Myoung-Han Kim, Gyeonggi-do (KR)

(73) Assignee: Core Biosystems Inc., Redmond, WA (US)

( * ) Notice: Subject to any disclaimer, the term of this patent is extended or adjusted under 35 U.S.C. 154(b) by 0 days.

(21) Appl. No.: 15/192,567

(22) Filed: Jun. 24, 2016

(65) Prior Publication Data

US 2017/0313837 A1 Nov. 2, 2017

(30) Foreign Application Priority Data

Apr. 28, 2016 (KR) .................. 10-2016-0051876

(51) Int. Cl.
C08J 7/04 (2006.01)

(52) U.S. Cl.
CPC ........... *C08J 7/047* (2013.01); *C08J 2379/00* (2013.01); *C08J 2400/00* (2013.01)

(58) Field of Classification Search
CPC .................................................. C08J 2379/00
See application file for complete search history.

(56) References Cited

U.S. PATENT DOCUMENTS 8,541,060 B2  9/2013  Messersmith et al.
8,999,452 B2  4/2015  Messersmith et al.

FOREIGN PATENT DOCUMENTS

KR  10-2003-0009732 A  2/2003

OTHER PUBLICATIONS

Chiba (Journal of Electroanalytical Chemistry and Interfacial Electrochemistry (1987) 219(1-2) 117-24) (Year: 1987).*

* cited by examiner

*Primary Examiner* — Kuo Liang Peng
(74) *Attorney, Agent, or Firm* — Mintz Levin Cohn Ferris Glovsky and Popeo, P.C.; Kongsik Kim; Joohee Lee (57) ABSTRACT

Disclosed herein is a substrate-independently surface-coated polymer by aromatic-amine compound and a coating method thereof, and in particular to a substrate-independently surface-coated polymer and a coating method thereof wherein an aromatic compound in which two or more amines are substituted on benzene, is substrate-independently surface-coated. The substrate-independently surface-coated polymer characterized in that the surface of a polymer substrate is coated in such a way to react, using a surface modifier, an aromatic compound of the following structural formula on at least one surface of the polymer substrate having a nucleophilic functional group or an electrophilic functional group.

15 Claims, 7 Drawing Sheets

SUBSTRATE-INDEPENDENTLY SURFACE-COATED POLYMER BY AROMATIC-AMINE COMPOUND AND COATING METHOD THEREOF

CROSS-REFERENCE TO RELATED APPLICATION

This application claims under 35 U.S.C. § 119(a) the benefit of priority to Korean Patent Application No. 10-2016-0051876 filed on Apr. 28, 2016, which is incorporated herein by reference.

TECHNICAL FIELD

The present invention relates to a substrate-independently surface-coated polymer by aromatic-amine compound and coating method thereof, and in particular to a substrate-independently surface-coated polymer and coating method thereof wherein an aromatic compound in which two or more amines are substituted on benzene, is substrate-independently surface-coated.

BACKGROUND ART

The chemical modification of any substrates is a critical success factor in chemical, biological and material sciences, engineering and applied technology. The primary method for such a chemical modification may include a surface treatment chemistry and other physicochemical techniques, whereby desired chemical and/or physical properties are created on non-functional substrates. Molecular species serving this purpose mostly have chemical function groups on both ends, in which one end is bound to given substrates and the other end offers chemical functionality to the substrate surface.

The Korean patent laid-open No. 10-2003-0009732 describes an organic molecular substrate the surfaces of which are coated with a multiplex amino ethyl molecular layer. This patent discloses an organic polymer substrate and a preparation method thereof, wherein a substrate formed of various organic polymers or oligomers containing nucleophilic functional groups react with aziridine or a derivative thereof, thus forming a multiplex amino ethyl molecular layer which consists of a high density polymer, whereby a physiochemical property can be changed. This technique discloses a method for modifying the surface of a substrate in such a way to react an aziridine compound with an organic polymer substrate.

The substrates available for conventional surface modification chemistry, however, are highly limited. This in turn causes the following issues for chemical modification of a substrate; (1) chemical specificity between surface modifying chemical species and substrates is required; (2) the substrate size/shape is often limited; (3) instrumentation is often required; (4) multi-step procedures, resulting in the lowered success rate and reliability, are required.

As a solution to this problem, a substrate-independent surface modification technique was invented, in which dopamine or other similar compounds containing both of catechol and amine functional groups was used under an alkalinene solution. The method employs a biomimetic mechanism of mussels to generate a natural surface-independent adhesive. Mussels attach to virtually all types of inorganic and organic substrates, including even adhesion-resistant materials such as Teflon (aka polytetrafluoroethylene; PTFE). With the aforementioned techniques, various surface modification applications could be made.

The laid-open U.S. Pat. No. 8,541,060 describes a multifunctional coating and an application thereof, wherein the surface can be modified surface-independently. This patent discloses a coating method wherein the surface can be modified in such a way to contact a dopamine or a dopamine-like compound with a substrate in an alkaline solution using a surface modifier.

The laid-open U.S. Pat. No. 8,999,452 describes a multifunctional coating and an application thereof. This patent discloses a method for modifying a substrate surface in such a way to contact a surface modifier, for example, dopamine, with a substrate in an alkaline state.

The aforementioned dopamine-based technologies may have the following problems in terms of technology. (1) This technique can be carried out only under an alkaline condition. Most of experiments are being carried out on a trisaminomethane buffer solution of 10 mM pH 8.5. This value is close to pKa (dissociation constant) of the dopamine, which is around pH 9. For this reason, reactivity might not be controlled as intended. (2) Two different reaction groups of hydroxyl groups and amine groups of dopamine compound may make it hard to evenly control surface functionality. (3) It is hard for amine groups to exist a lot due to a chemical structure, so the performance of the following applications which could be carried out based on the modification of the amine structure, may be limited.

In order to resolve the aforementioned problems, a substrate-independent surface modification method is required.

SUMMARY OF THE DISCLOSURE

The present invention has been made in an effort to solve the above-described problems associated with prior art.

It is an object of the present invention to provide a method wherein the surface of a solid substrate surface can be chemically modified irrespective of a substrate in such a way to use an aromatic compound wherein two or more amines are substituted.

It is another object of the present invention to provide a polymer wherein an aromatic compound in which two or more amines are substituted, is coated.

To achieve the above objects, there is provided a substrate-independently surface-coated polymer characterized in that the surface of a polymer substrate is coated in such a way to react, using a surface modifier, an aromatic compound of the following structural formula on at least one surface of the polymer substrate having a nucleophilic functional group or an electrophilic functional group, wherein $R_1$ is any of H, $NH_2$ and NH-acyl.

The surface modification is carried out in such a way that the aromatic compound is inputted in an aqueous solution and is oxidized in the aqueous solution, and is reacted with a nucleophilic functional group of the polymer substrate, thus modifying the substrate surface into the following structure.

Moreover, the surface modification is carried out in such a way that the aromatic compound is inputted in an aqueous solution and is reduced into the structural formula in the aqueous solution, and is reacted with an electrophilic functional group of the polymer substrate, thus modifying the substrate surface into the following structure.

The aqueous solution according to the present invention is any of an acidic solution, a neutral solution and an alkaline solution.

In the present invention, the aromatic amine compound of the modified substrate surface is polymerized into a polymer since it is polymerized with another aromatic amine compound.

In the present invention, the polymer substrate is a solid mass formed in any of a bead shape, a plate shape, a tube shape and a spherical shape.

In the present invention, a biochemical substance including a cell, a protein, a hexane or a synthesized polymer is fixed, using a linker molecule, on the modified substrate surface.

To achieve the above objects, there is provided a method for preparing a substrate-independently surface-coated polymer by aromatic amine compound, which may include, but is not limited to, inputting an aromatic amine compound of the following structural formula in an aqueous solution in order to make an oxidation and reduction reaction; modifying at least one surface of a polymer substrate having a nucleophilic functional group or an electrophilic functional group in such a way to contact it with the aqueous solution wherein the aromatic amine compound is used to surface modifier; washing the surface-modified substrate; and drying the washed substrate, wherein $R_1$ is any of H, $NH_2$ and NH-acyl.

The aqueous solution according to the present invention is any of an acidic solution, a neutral solution and an alkaline solution.

In the present invention, the polymer substrate is a solid mass formed in any of a bead shape, a plate shape, a tube shape and a spherical shape.

In the step for modifying the surface, the aromatic amine compound of the modified substrate surface is polymerized into a polymer since it is polymerized with another aromatic amine compound.

In the present invention, a biochemical substance including a cell, a protein, a hexane or a synthesized polymer is fixed, using a linker molecule, on the modified substrate surface.

In the present invention, a mass production is available since the surface of a solid substrate can be chemically modified irrespective of the substrate in such a way to use an aromatic compound wherein two or more amines are substituted.

In addition, the present invention is able to provide a biochemical substance having a high separation yield and reliability since a biochemical substance can be fixed based on the substituted amine and the number of the substituted amines.

Moreover, workability is good since reactions could be carried out on any of acidic, neutral and alkaline solution.

Furthermore, the present invention employs a structure having a lot of amine groups which are reactive functional groups, the time for separating biochemical substances can be greatly reduced.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The configuration and operation of an exemplary embodiment of the present invention will be described with reference to the accompanying drawings.

Figure 1:
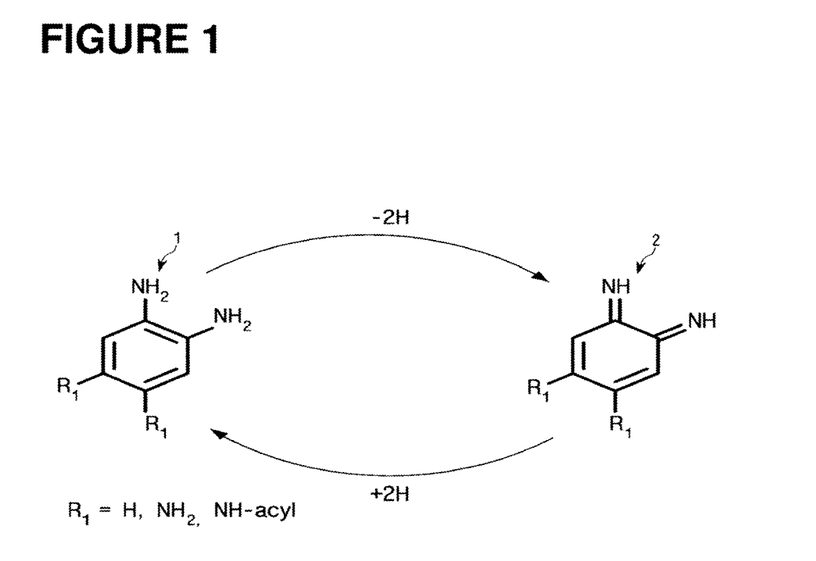
FIG. 1 is a view illustrating an oxidation and reduction reaction of an aromatic amine compound according to the present invention.
Figure 2:
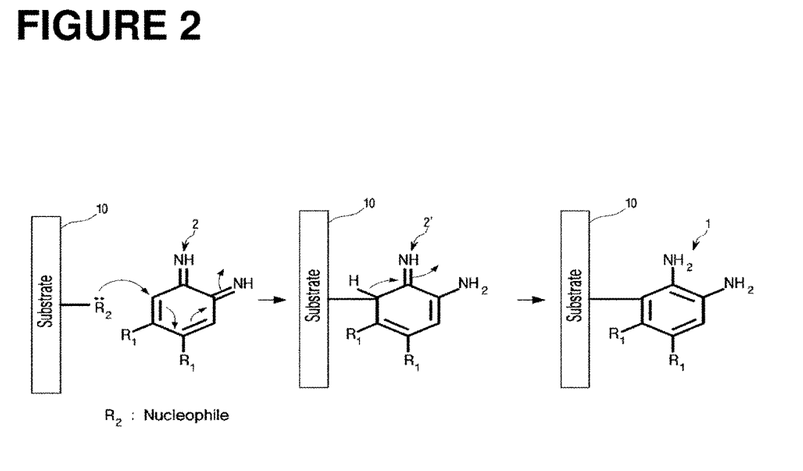
FIG. 2 is a view for describing a reaction procedure between an aromatic amine compound and a nucleophilic substrate according to the present invention.
Figure 3:
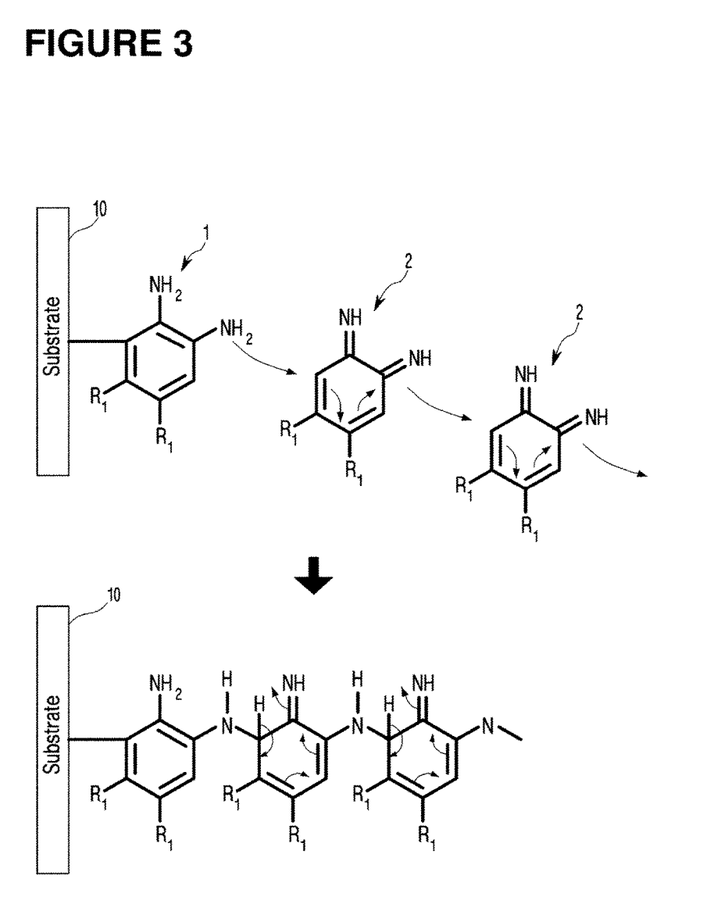
FIG. 3 is a view illustrating a polymerization reaction of an aromatic amine compound bond with a nucleophilic substrate according to the present invention.
Figure 4:
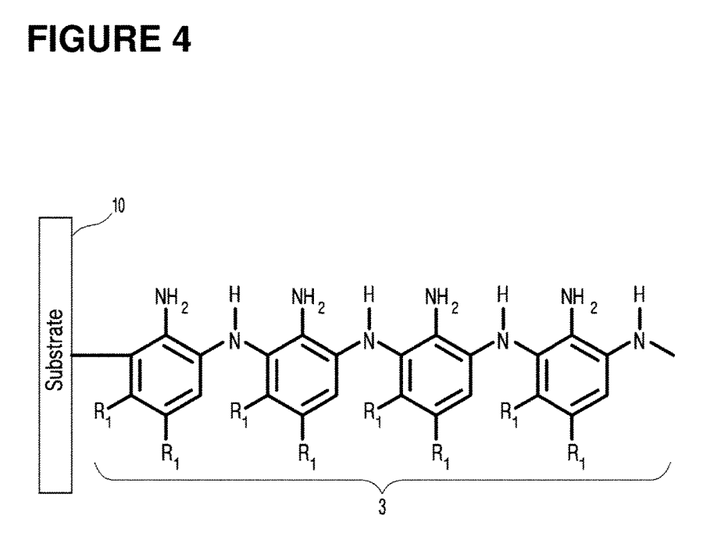
FIG. 4 is a view for describing a state where an aromatic amine compound bond with a nucleophilic substrate has been polymerized according to the present invention.
Figure 5:
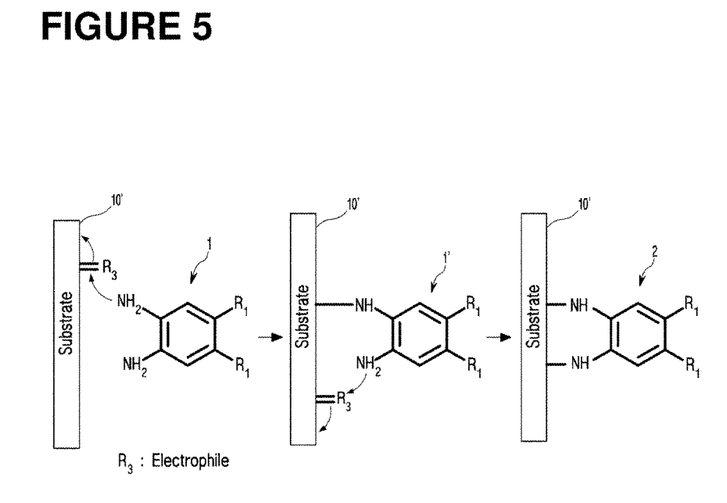
FIG. 5 is a view for describing a reaction procedure between an aromatic amine compound and an electrophilic substrate according to the present invention.
Figure 6:
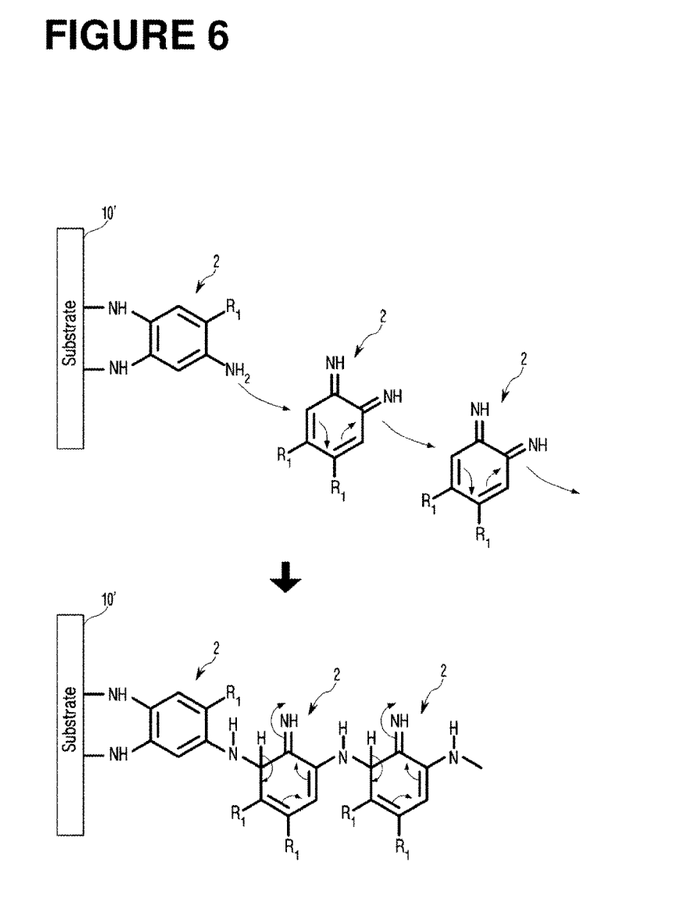
FIG. 6 is a view for describing a polymerization reaction of an aromatic amine compound bound with an electrophilic substrate according to the present invention.
Figure 7:
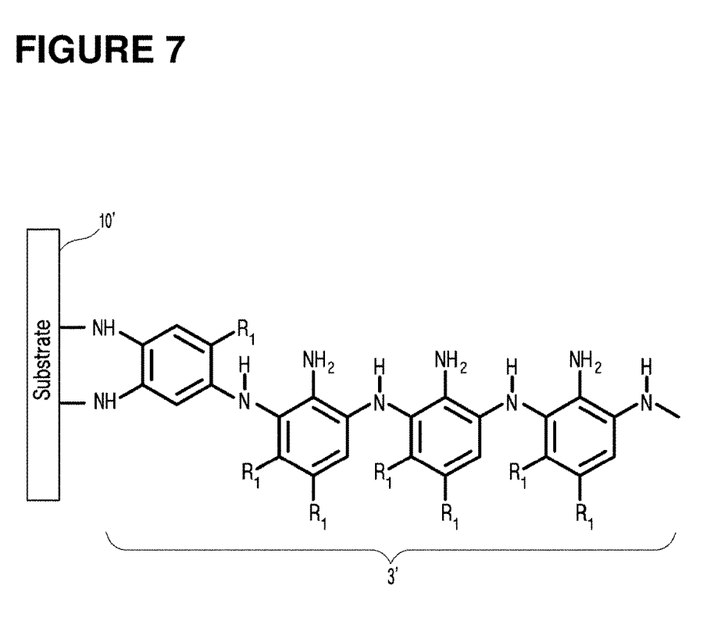
FIG. 7 is a view for describing a state where an aromatic amine compound bond with an electrophilic substrate has been polymerized according to the present invention.

FIG. 1 is a view illustrating an oxidation and reduction reaction of an aromatic amine compound according to the present invention, FIG. 2 is a view for describing a reaction procedure between an aromatic amine compound and a nucleophilic substrate according to the present invention, FIG. 3 is a view illustrating a polymerization reaction of an aromatic amine compound bond with a nucleophilic substrate according to the present invention, FIG. 4 is a view for describing a state where an aromatic amine compound bond with a nucleophilic substrate has been polymerized according to the present invention, FIG. 5 is a view for describing a reaction procedure between an aromatic amine compound and an electrophilic substrate according to the present invention, FIG. 6 is a view for describing a polymerization reaction of an aromatic amine compound bound with an electrophilic substrate according to the present invention, and FIG. 7 is a view for describing a state where an aromatic amine compound bond with an electrophilic substrate has been polymerized according to the present invention.

As illustrated in FIG. 1, the surface modifier employed in the present invention is an aromatic amine compound. FIG. 1 is a view for describing an oxidation and reduction reactions of a benzene diamine 1 and a benzene diimine 2. As illustrated therein, during the aforementioned oxidation and reduction reactions, the benzene diamine 1 is oxidized into the benzene diimine 2, and the benzene diimine 2 is reduced into the benzene diamine 1. If the value of pKa is higher, the oxidation reaction of the benzene diamine may be carried out better. Thus, as the aqueous solution is gradually changed from the acidic state to the alkaline state, the oxidation reaction of the benzene diamine 1 may be carried out better by the chemical property of the amine. More specifically, since the amine is oxidized based on the degree of ionization, although the amine can be oxidized in the acidic state which the degree of ionization is low, the higher the degree of ionization is, the faster the oxidation of amine can be carried out. H, $NH_2$ or NH-acyl may be substituted on an alkyl group ($R_1$) of the benzene diamine 1 or the benzene diimine 2 which are the surface modifiers. The substrate employed in the present invention may be substrate-independent, but the aforementioned substrate should have a functional group which can be employed for the sake of a nucleophilic or electrophilic chemical bond. As the nucleophilic functional groups, there are —$NH_2$, —SH, —OH etc. The benzene diamine 1 will be expressed as a surface modification monomer.

FIG. 2 is a view illustrating a procedure wherein in a state (2) where the amine, which is a surface modification monomer, has been oxidized into an imine, the nucleophilic functional group of the substrate 10 reacts with a carbon atom while sharing with a non-shared electron pair, and it is reduced into a surface modification monomer 1 and is bonded to a substrate. This procedure is referred to one surface modification monomer 1. If a plurality of surface modification monomers 1 react with a plurality of nucleophilic substrates and are bonded to the surface of polymer, the surface of the polymer may be modified into a substrate having an amine group, which is a reaction group, by a plurality of the surface modification monomers 1.

FIGS. 3 and 4 are views illustrating a procedure wherein the surface modification monomers 1 are polymerized through a polymerization reaction. As illustrated therein, the nitrogen atoms of the surface modification monomers 1 bonded to the substrate will nucleophilically react with the carbon atoms of other oxidized surface modification monomers 2 which are in free states, and the surface modification monomers 2 will be polymerized together into polymers as illustrated in FIG. 4. The amine group which is a functional group may be formed condensed in a highly polymerized compound 3 and may react with a biochemical substance, whereby the yield that the biochemical substances can be fixed or separated based on the number of amine groups can be greatly increased. A plurality of the surface modification monomers 1 or the surface modification polymers 3, therefore, may be formed on the surface of the polymer, whereupon the time that the biochemical substances are separated and extracted, can be greatly reduced. Moreover, if —$NH_2$ or NH-acyl is substituted on the alkyl group (R1), more functional groups can be obtained, by means of which the separation and extraction functions of the biochemical substance can be more improved in terms of separation time and yield.

FIG. 5 is a view illustrating a state where the electrophilic substrate 10' is reacting with the surface modification monomer 1. As illustrated therein, the non-shared electron pair of nitrogen which form an amine group is involved in the reaction group ($R_3$) of the electrophilic substrate 10'. The non-shaped electron pair of the nitrogen of a first amine group will react with the reaction group ($R_3$) of the electrophilic substrate and will lose electrons and will be bonded to the electrophilic substrate 10'. Moreover, the non-shared electron pair of nitrogen of a second amine group will react with the reaction group ($R_3$) of the electrophilic substrate 10' and will lose electrons and will be bonded to the electrophilic substrate 10'. Two amine groups, therefore, will be bonded to the electrophilic substrate 10', and the amine groups will be substituted on the remaining alkyl groups ($R_1$) and will react with the biochemical substance, whereupon the separation and extraction can be carried out. For this reason, at least three amine groups should be substituted on the surface modification monomer 1 which may operate on the electrophilic substrate 10'. Any of the alkyl groups ($R_1$), therefore, should be substituted into an amine group ($NH_2$), and the rest thereof may be any of hydrogen, amine and acylimine. FIG. 6 is a view illustrating a polymerization reaction with other free surface modification monomers 2 which have been oxidized after the surface modification monomers 1 are bonded to the electrophilic substrate. As illustrated therein, the amine group of the surface modification monomer 1 will nucleophilically react with the carbon of other oxidized free surface modification monomers 2, whereupon a polymer 3' as in FIG. 7 can be obtained. Since the amine group which is a functional group is condensed, the fixing and extraction of the biochemical substance can be quickly processed. Moreover, the yield that the biochemical substance, for example, DNA, etc. is extracted can be greatly increased due to the condensed amine group.

The aromatic amine compound employed in the present invention may be 1,2,4-benzene-triamine or 1,2,4,5-benzene-tetraamine (BTA). The 1,2,4,5-benzene-tetraamine can be called 1,2,4,5-tetraaminebenzene. In case of the aforementioned benzene-triamine, since it has three amine groups, one among the alkyl groups ($R_1$) may be substituted into an amine group, and the other one may be in a hydrogen state. Moreover, the benzene-tetraamine is that the alkyl groups ($R_1$) all are substituted into amine groups.

The method for coating the surface modification monomer on the polymer substrate according to the present invention will be described. The polymer substrate is formed of an organic polymer compound and should be a solid polymer substrate which may have a nucleophilic functional group ($R_2$) or an electrophilic functional group ($R_3$). First of all, a surface modification monomer 1 with a predetermined concentration is inputted in an aqueous solution and is mixed well. The polymer substrate to have nucleophilic functional group react with the surface modification monomer 1 that imine is oxidized from the amine, and the substrate to have electrophilic functional group react with the surface modification monomer 1 that amine is reduced from the imine. The aforementioned aqueous solution may be any of acidic, neutral and alkaline solutions, provided that if it is a alkaline solution, the reaction may be carried out faster since the degree of ionization is high, which, however, is not limited thereto. The solid substrate may be dipped in the aqueous solution that the surface modification monomer 1 makes an oxidation and reduction reaction or the aqueous solution inputted with the surface modification monomer 1 may be filled in the solid substrate. The aforementioned mixture is placed in this state for a predetermined time long enough to react with the solid substrate. The mixture may be heated or stirred to activate the bonding. Moreover, if it is available to use catalyst, a predetermined catalyst may be inputted so as to accelerate reaction. The solid substrate is washed after a predetermined time has passed, and the surface modification monomers 1 or any impurities which are not bonded or polymerized are removed. In case of the coating of polymer, any substances which are not bonded to the substrate having hydrophilic or hydrophobic property, are removed through multiple washing steps. When the monomers 1 or any impurities which are not bonded or polymerized to the substrate are removed, it is dried and packed in a vacuum state, thus finishing the preparation of a product. The solid polymer substrate may be formed in any of various shapes, for example, a bead shape, a plate shape, a tube shape or a spherical shape, which, however, is not limited thereto.

The fixing and separation of a biochemical substance, for example, DNA, etc. which is carried out using a surface-modified polymer substrate according to the present invention will be described. An acidic solution is inputted in the solid polymer substrate to which a plurality of the surface modification monomers 1 have been bonded or which has been coated with a polymerized highly polymerized compound. The amine group of the substrate surface may have proton in the acidic solution and may be electrified into positive electric charges. In a state where the acidic solution is inputted, a sample having a biochemical substance, for example, DNA, etc. is inputted. The solid substrate surface electrified into the positive electric charges is bonded with the DNA which has been electrified with the electrons from the given sample mixture, whereby it is possible to selectively capture the biochemical substances, for example, DNA, etc. The rest of the samples is removed in a state where the DNA is captured. An alkaline solution is inputted in the solid substrate. Since the amine of the polymer substrate surface loses protons in the alkaline state, the captured DNA molecules will release from the surface where the DNA molecules are coated. Likewise, a selective purification of DNA, etc. is available from the sample mixture.

Furthermore, since the amine can be modified through a standard linker reaction using a linker molecule, it is possible to fix various biological/chemical substances, for example, cells, proteins, hexanes, synthesized molecules. As a result, the present invention may be adapted to the purification, separation or detection of a predetermined target analysis substance.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

LEGENDS OF REFERENCE NUMBERS

1: Aromatic amine
2: Aromatic imine
3, 3': Highly polymerized compound of aromatic amine
10: Nucleophilic substrate
10': Electrophilic substrate

What is claimed is:

1. A substrate-independently surface-coated polymer by an aromatic amine compound characterized in that the surface of a polymer substrate is modified in such a way to react, using a surface modifier, an aromatic amine compound of the following structural formula on at least one surface of the polymer substrate having a nucleophilic functional group or an electrophilic functional group, wherein $R_1$ is any of H, $NH_2$ and NH-acyl.

2. The substrate of claim 1, wherein the surface modification is carried out in such a way that the aromatic compound is inputted in an aqueous solution and is oxidized, and is reacted with a nucleophilic functional group of the polymer substrate, thus modifying the substrate surface into the following structure.

3. The substrate of claim 1, wherein the surface modification is carried out in such a way that the aromatic compound is inputted in an aqueous solution and is reduced into the structural formula, and is reacted with an electrophilic functional group of the polymer substrate, thus modifying the substrate surface into the following structure.

4. The substrate of claim 2, wherein the aqueous solution is any of an acidic solution, a neutral solution and an alkaline solution.

5. The substrate of claim 3, wherein the aqueous solution is any of an acidic solution, a neutral solution and an alkaline solution.

6. The substrate of claim 2, wherein the aromatic amine compound of the modified substrate surface is polymerized into a polymer since it is polymerized with another aromatic amine compound.

7. The substrate of claim 3, wherein the aromatic amine compound of the modified substrate surface is polymerized into a polymer since it is polymerized with another aromatic amine compound.

8. The substrate of claim 1, wherein the polymer substrate is a solid mass formed in any of a bead shape, a plate shape, a tube shape and a spherical shape.

9. The substrate of claim 2, wherein a biochemical substance including a cell, a protein, a hexane or a synthesized polymer is fixed, using a linker molecule, on the modified substrate surface.

10. The substrate of claim 3, wherein a biochemical substance including a cell, a protein, a hexane or a synthesized polymer is fixed, using a linker molecule, on the modified substrate surface.

11. A method for preparing a surface-independently modified multifunctional polymer substrate, comprising:
inputting an aromatic amine compound of the following structural formula in an aqueous solution in order to make an oxidation and reduction reaction;
modifying at least one surface of a polymer substrate having a nucleophilic functional group or an electrophilic functional group in such a way to contact it with the aqueous solution wherein the aromatic amine compound in the aqueous solution is oxidized and reacts with the nucleophilic functional group of the polymer substrate, and the aromatic amine compound in the aqueous solution is reduced and reacts with the electrophilic functional group of the polymer substrate;
washing the surface-modified substrate; and
drying the washed substrate, wherein $R_1$ is any of H, $NH_2$ and NH-acyl.

12. The method of claim 11, wherein the aqueous solution is any of an acidic solution, a neutral solution and an alkaline solution.

13. The method of claim 11, wherein the polymer substrate is a solid mass formed in any of a bead shape, a plate shape, a tube shape and a spherical shape.

14. The method of claim 11, wherein in the step for modifying the surface, the aromatic amine compound of the modified substrate surface is polymerized into a polymer since it is polymerized with another aromatic amine compound.

15. The method of claim 11, wherein a biochemical substance including a cell, a protein, a hexane or a synthesized polymer is fixed, using a linker molecule, on the modified substrate surface.

* * * * *